July 25, 1944.   P. VAN SICKLE   2,354,625
UNIVERSAL POWER SAW
Filed July 30, 1942   2 Sheets-Sheet 2
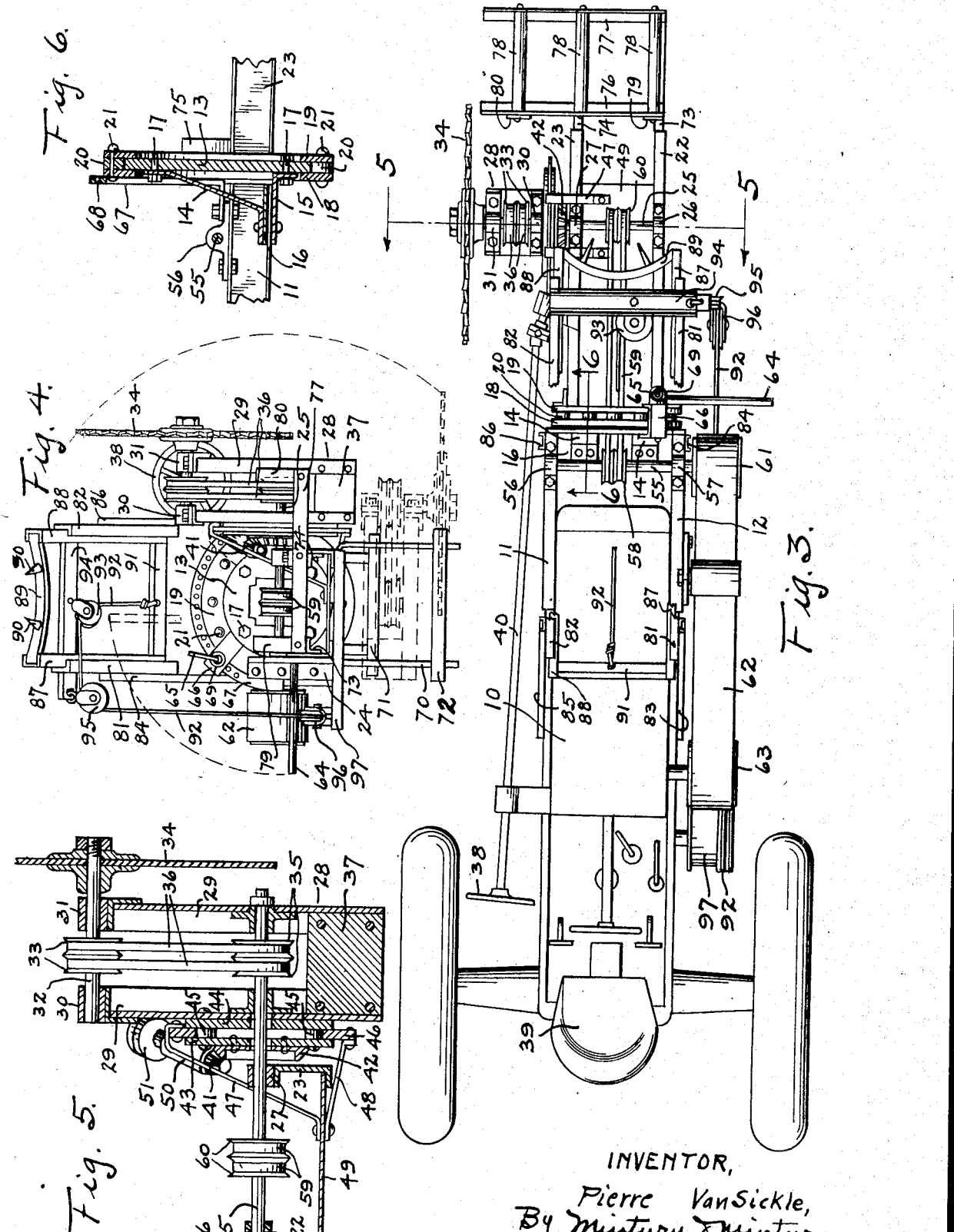
INVENTOR,
Pierre VanSickle,
By Minturn & Minturn,
Attorneys.

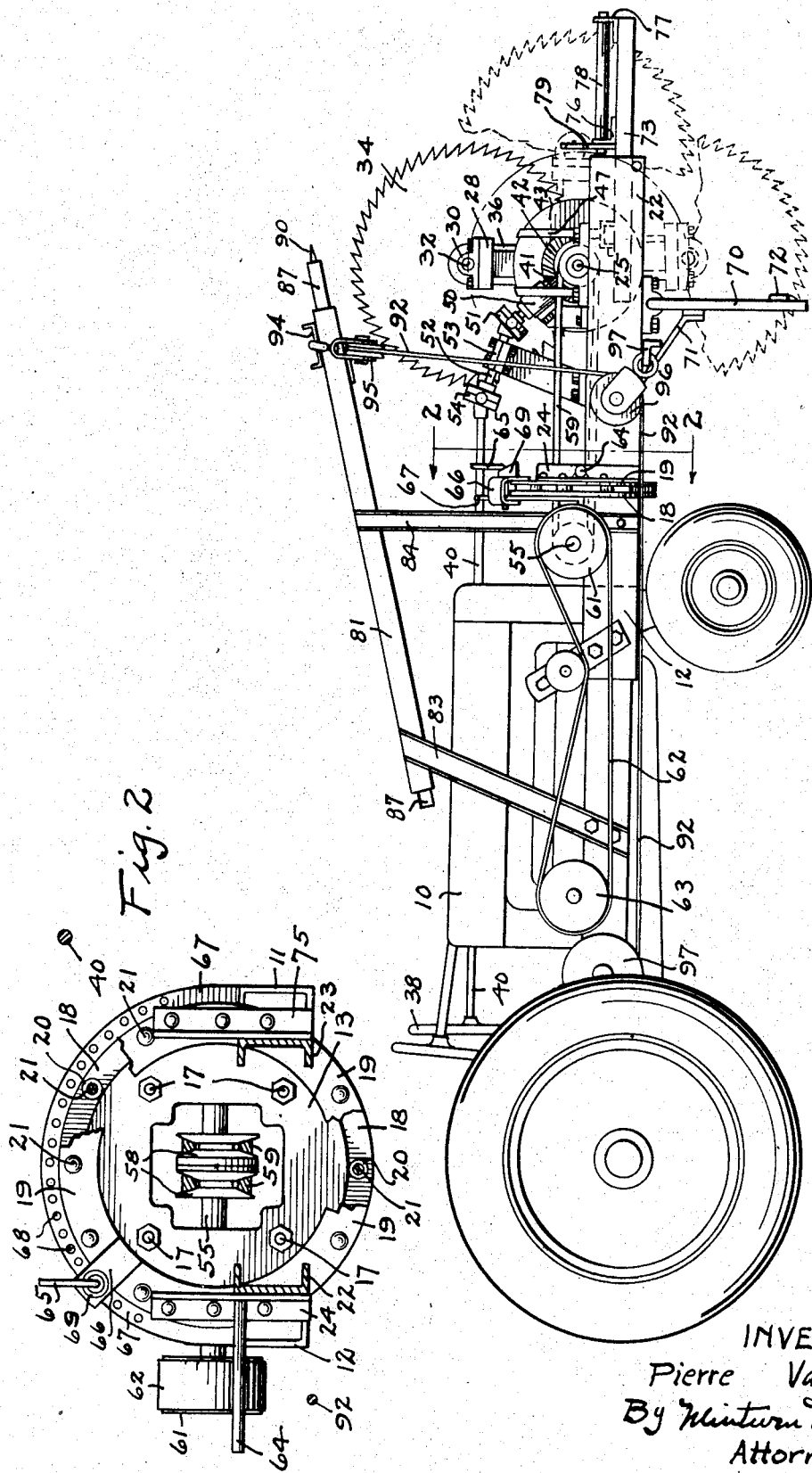

Patented July 25, 1944

2,354,625

UNITED STATES PATENT OFFICE 2,354,625

UNIVERSAL POWER SAW

Pierre Van Sickle, Indianapolis, Ind.

Application July 30, 1942, Serial No. 452,895

2 Claims. (Cl. 143—43)

This invention relates to means for attaching to a mobile power unit, such as a farm tractor or the like, for sawing down timber, cutting down trees, trimming limbs from down logs, and for cutting cord wood.

A primary object of the invention is to provide a structure of the type above indicated which is quite universal in its range of operation in that a circular saw may be operated as a swinging cut-off saw from a vertically disposed plane around through any angle therefrom to a lower horizontally disposed plane, all without having to alter in any respect by belt change or gear shifting the saw driving system between it and the power unit.

A further important object of the invention is to provide a unit of the type above indicated which may be readily attached and detached to and from the tractor whereby power may be utilized from that tractor, and further whereby the tractor itself may supply power to apply pressure against a standing tree to prevent pinching action on the cutting off saw.

These and many other objects and advantages of the invention will become apparent to those versed in the art in the following description of one particular form of the invention as illustrated in the accompanying drawings, in which Fig. 1 is a view in side elevation illustrating the invention as attached to a tractor;

Fig. 2, a view in section on an enlarged scale on the line 2—2 in Fig. 1;

Fig. 3, a top plan view of the invention attached to the tractor;

Fig. 4, a view in front elevation of the structure embodying the invention;

Fig. 5, a view in vertical transverse section on the line 5—5 in Fig. 3, on an enlarged scale; and Fig. 6, a detail in vertical longitudinal section on an enlarged scale on the line 6—6 in Fig. 3.

Like characters of reference indicate like parts throughout the several views in the drawings.

The invention may be applied to a wide range of types of tractor units, one such unit being shown in the drawings and generally designated by the numeral 10. In the present form of the invention, channel irons 11 and 12 are respectively applied over the forward ends of the tractor frame in a telescoping manner whereby these irons 11 and 12 may extend forwardly from the tractor frame a short distance, serving as cantilever extensions of the frame. A disc 13 is fixed in a vertically disposed position across the front ends of these irons 11 and 12 by any suitable means, Fig. 6, herein shown as by the upper and lower braces 14 and 15 respectively engaging by their inner ends with a transverse frame member 16 secured in turn to and between the irons 11 and 12. The forward ends of the braces 14 and 15 are interconnected with the disc 13 by any suitable means, such as by the bolts 17. Thus the disc 13 is rigidly supported by the extending irons 11 and 12 in a vertically aligned position.

A pair of rings 18 and 19, having flat parallel opposing faces with internal diameters less and external diameters greater than the diameter of the disc 13, are slidingly fitted against the rear and front faces respectively of the disc 13 and axially centered thereof by means of a plurality of rollers 20 spacing apart those rings 18 and 19 and riding on the periphery of the disc 13. These rollers 20 are revolubly secured between the rings 18 and 19 by any suitable means, herein shown as by means of the rivets 21 passing through the rollers and both rings to be headed on each side thereof. The rings 18 and 19 thus assembled on the disc 13 may be revolved circumferentially around the disc 13 without disengagement therefrom by reason of the rings overlapping radially inwardly on the respective faces of the disc.

Secured to the front face of the ring 19 are a pair of horizontally spaced apart frame members 22 and 23, herein shown as being in the shape of channel irons and reinforced in their connections with the ring 19 by means of angle bars 24 and 15 extending upwardly along the outer faces respectively of the members 22 and 23 and then up along the outer face of the ring 19. See Fig. 2. The inner ends of the members 22 and 23 are preferably welded to the face of the ring 19. These members 22 and 23 extend horizontally forwardly to receive thereacross a carrier shaft 25, this shaft being carried by suitable bearing blocks 26 and 27 mounted respectively on the members 22 and 23 to have the shaft 25 extending transversely across the members 22 and 23, herein shown as on the upper sides thereof.

The shaft 25, Figs. 3–5, has a length extending outwardly beyond the member 23 on which is rotatably mounted a swing frame 28. This frame 28 is composed essentially of corner angle irons 29 carrying bearings that fit over the shaft 25, and that also carry upper bearings 30 and 31 through which extends the saw mandrel 32. The bearings 30 and 31 are spaced apart sufficiently to have one or more belt driving pulleys 33, herein shown as two in number, mounted on the shaft 25. A circular saw 34 is mounted on the outer end of the shaft 32 which extends beyond the outer left-hand side of the frame 28.

One or more pulleys 35, herein shown as two in number, corresponding in number with the number of pulleys mounted on the mandrel 32, are mounted on the shaft 25 within the frame 28, and belts 36, herein shown as of the V-type, are placed around the respective pulleys 33 and 35 for driving connections therebetween.

The lower end of the frame 28 carries a counterweight 37 as a means for approximately counterbalancing the mass including the saw carried above the shaft 25. The spacing apart of the mandrel 32 and the shaft 25 (one is mounted parallel with the other) will depend somewhat upon the diameter of the saw 34 with which it is desired to saw, although the diameter is not the limiting factor. The framework 28 should be sufficiently long in reference to its extension from the shaft 25 to permit mounting on its inner face adjacent the frame member 23 means for mechanically rotating the frame 28 on the shaft 25.

To rotate the frame 28 and control its position of rotation, regardless of whether the saw 34 be revolving or stationary, a handwheel 38 is mounted in any suitable position along the tractor 10, herein shown as adjacent the operator's seat 39, Fig. 3. From this handwheel 38 extends a shaft 40 into driving engagement with a pinion gear 41 that is in constant mesh with a ring gear 42 that is mounted relatively stationary in respect to the frame 28 whereby rotation of the gear 41 through the wheel 38 will cause the frame 28 to rotate about the shaft 25. This result may be produced in any number of ways, one particular form being herein shown wherein the ring gear 42 is mounted on a disc 43 that is spaced from a second disc 44 by a plurality of rollers 45, Fig. 5. The disc 44 is fixed to the inner side of the frame 28 and the shaft 25 extends freely through both discs 43 and 44. Between the discs 43 and 44 is a ring 46 having an internal diameter less than the diameters of the discs 43 and 44 and so formed as to have the inner periphery of this ring ride on the rollers 45. The ring 43 is fixed in position relative to the forward frame members 22 and 23 by upper and lower braces 47 and 48 respectively, the inner ends of which are fixed to and across member 49 which is in turn fixed to and between the frame members 22 and 23.

The pinion gear 41 is held in constant mesh with the ring gear 42 by a suitable supporting bracket 50 from which a shaft extends to engage a universal joint 51 in turn fixed on a shaft 52 supported by the bracket 53, Fig. 1. The shaft 52 in turn engages with a universal joint 54 to which the control shaft 40 is attached. Thus by revolving the handwheel 38, the pinion gear 41 may likewise be turned causing corresponding rotation of the frame 28 about the shaft 25. By means of the discs 43 and 44 with the intervening ring 46, bending stress on the shaft 25 due to the weight of the frame 28 and the elements carried thereby, is relieved without interfering with the rotation of the frame 28 throughout 360 degrees of travel.

A jackshaft 55 is carried transversely across the tractor extension frame irons 11 and 12 back of the disc 13 by suitable bearing blocks 56 and 57. See Fig. 3. Driving pulleys 58, Fig. 2, herein shown as two in number, are mounted in a fixed manner on the shaft 55 centrally between the frame irons 11 and 12 to carry V-belts 59 which extend through a central opening provided in the disc 13 to engage around like pulleys 60 fixed on the shaft 25. The forward frame members 22 and 23 are spaced equidistant from the longitudinal center line which falls on the axis of the disc 13. On the outer right-hand end of the shaft 55 is fixed a driving pulley 61, herein shown as being driven by a belt 62 from the power take-off pulley 63 of the tractor 10.

As above indicated, the rings 18 and 19 are revoluble around the disc 13 and therefore the forwardly extending frame members 22 and 23, with all of the elements above described as being carried thereby, are likewise revoluble around the forwardly extending horizontal axis of the disc 13. To control and fix the position of revolution of this forwardly extending framework, a handle bar 64 has an inner end fixed to one of the rings 18 and 19, herein shown as to the ring 19 through the angle bar 24. The bar 64 extends outwardly a sufficient distance to provide leverage permitting an operator to lift the weight of the frame 28 and its attendant parts. A latch pin 65 has a length which extends through a yoke 66 that is fixed to the ring 19 and turns over and downwardly behind a sector 67 which is provided with a plurality of holes 68 through which a horizontally disposed length of the pin 65 may be inserted. For convenience, a cam block 69 is provided through which the pin 65 is inserted whereby rocking of the pin 65 will tend to withdraw it from engagement through a hole 68 in the sector 67. This sector 67 is carried in a fixed manner by having its feet secured to the top sides of the frame irons 11 and 12.

Now by releasing the pin 65, the forward carriage consisting of the base members 22 and 23 may be swung around to rock the saw 34 through a line of travel as indicated by the dash lines in Fig. 4, any intermediate position being maintained by re-engaging the pin 65 with the sector 67. This may be accomplished regardless of whether the saw 34 is in motion or stationary since this turning movement does not affect the driving of the saw 34 other than to cross the belts 59 during the turning movement, this crossing in no manner affecting the continuity of drive and permitting the carriage to be swung at will without having to shift belts or the like. By reason of the mounting of the belts 59 to be about the longitudinal axis of the structure, this crossing is permitted without setting up any undue tension on the belts, the belts 59 being of the V-type to maintain drive without appreciable slippage.

Suspended from the under side of the frame members 22 and 23 is a U-shaped stop or push member 70, the legs of which are free to swing downwardly normally and the interconnecting bar of which is rockably mounted in suitable bearings secured to the under side of the frame members 22 and 23. A bracket 71 is also secured to the under sides of the members 22 and 23 in a fixed manner to extend downwardly and forwardly to serve as a stop against which the member 70 may swing and rest. Preferably the lower ends of the legs of the member 70 are tied together by a crossbar 72. The lower ends of the legs of this member 70 terminate a slight distance above the ground level so that the tractor 10 may be free to move about without the ends of these legs digging into the ground. This member 70 serves as a stop against which a log may bear as it is being cut off while lying on the ground when the saw is in its lowermost dash line position, Fig. 1. Also this member 70 may be employed to push against a log to roll it along on the ground or move it bodily as the occasion may arise.

Fitting within the frame members 22 and 23 in a telescoping manner are a pair of spaced apart bars 73 and 74, Fig. 3, on the forward ends of which that project beyond the members 22 and 23 are a pair of transversely extending angle bars 76 and 77. These bars 76 and 77 extend beyond the bar 74, Fig. 3, to terminate by their ends in a vertical plane spaced slightly to the right of the plane of the saw 34. Rotatably secured between these angle bars 76 and 77 are a plurality of rollers 78, herein shown as three in number. This structure supported in an extended manner from the frame members 22 and 23 serves as a table across which small logs, limbs and the like may be positioned to have outwardly extending ends in the path of the saw 34 to be cut off thereby. The table structure is further provided preferably with a pair of upturned back guards 79 and 80 against which the material being cut off may be pushed and held during the sawing operation.

When the saw 34 is to be operated in a horizontally disposed position, such as indicated by the dash lines in Fig. 4, particularly when a standing tree is being cut, my invention incorporates means for applying pressure against the tree away from the saw first in order to prevent binding of the faces of the kerf upon the saw and, secondly, to push the tree on over away from the tractor and its attached sawing mechanism in order to direct the line of fall of the tree.

This structure for applying pressure to the standing tree consists essentially of an inclined pair of rails 81 and 82 having their forward ends at a higher elevation than their rear ends and supported from the tractor and the side irons 11 and 12 in any suitable manner, such as by the standards 83, 84 and 85, 86. Telescoping with these rails 81 and 82 are rails 87 and 88 respectively to be free to slide therealong in a fore and aft direction. These telescoping rails 87, 88 are tied together at their forward ends in any suitable manner, such as by the arcuate bar 89 curving rearwardly and having extending from its forward face a plurality of tree engaging spikes 90, herein shown as being two in number.

The rear ends of the telescoping rails 87 and 88 are tied together by a crossbar 91 to which a cable 92 is secured to extend forward around a pulley 93 secured to a crossbar 94 that is attached to the rails 81 and 82. See Fig. 4. From the pulley 93 the cable extends laterally to a pulley 95 carried on the outer end of an extending portion of the bar 94, and from which pulley 95 the cable is carried downwardly to engage about a third pulley 96 that is anchored to a bar 97 extending laterally to the right from fixed engagement with the frame members 22 and 23. The cable extends around from the under side of this pulley 96 and back to a winch drum 97 that is carried by the tractor 10 and power driven therefrom under selective control. By the arrangement just described, the drum 97, upon being revolved in a clockwise direction, Fig. 1, will wind the cable 92 thereon and cause the telescoping rails 87 and 88 to travel forwardly. By this forward travel, the spikes 90 may be pushed against the tree being cut in its standing position whereby the tree may eventually be tilted over to permit it to drop under the influence of gravity. Of course the tractor 10 will be positioned on the most favorable side of the tree to cause the tree to drop in the direction indicated by the aid of the push given by the mechanism just described.

While I have herein shown and described my invention in the one particular form, it is obvious that structural variations may be employed without departing from the spirit of the invention and I therefore do not desire to be limited to that precise form beyond the limitations as may be imposed by the following claims.

I claim:

1. A cut-off saw device comprising a support frame; driving means carried on the frame; a rockable frame; means interengaging the rockable frame and the support frame to support and confine the rockable frame to rotation about a horizontal longitudinal axis; a shaft mounted on the rockable frame substantially normal to said axis and transversely thereacross; a saw swing frame; means rockably mounting said swing frame on said shaft entirely to one side of said rockable frame to have its rotative axis in common with the axis of said rockable frame carried shaft; a saw mandrel carried by said swing frame spaced from said shaft and substantially parallel thereto; a saw mounted on the mandrel; driving means between said mandrel and said shaft; driving means between said support frame carried driving means and said rockable frame shaft; means for holding said rockable frame in selected positions of its rotation; and means for swinging said swing frame about its said axis throughout 360 degrees of travel.

2. A cut-off saw device comprising a support frame; driving means carried on the frame; a rockable frame; means interengaging the rockable frame and the support frame to support and confine the rockable frame to rotation about a horizontal longitudinal axis; a shaft mounted on the rockable frame substantially normal to said axis and transversely thereacross; a saw swing frame; means rockably mounting said swing frame on said shaft entirely to one side of said rockable frame to have its rotative axis in common with the axis of said rockable frame carried shaft; a saw mandrel carried by said swing frame spaced from said shaft and substantially parallel thereto; a saw mounted on the mandrel; driving means between said mandrel and said shaft; driving means between said support frame carried driving means and said rockable frame shaft and centered about the axis of rotation of the rockable frame; means for holding said rockable frame in selected positions of its rotation; and means for swinging said swing frame about its said axis; said rockable and support frame interengaging means consisting of a fifth wheel-like structure comprising a member having a circular bearing surface in a plane normal to said rockable frame axis and fixed to one frame, a second member fixed to the other of said two frames, a plurality of rollers spaced apart circumferentially around the second member, said second member being formed to have spaced apart walls adjacent said rollers, between which walls a portion of said bearing surface member is received for holding it against lateral displacement and vertical rocking of the rockable frame axis.

PIERRE VAN SICKLE.